US012670101B2

(12) United States Patent
Musgrove

(10) Patent No.: US 12,670,101 B2
(45) Date of Patent: Jun. 30, 2026

(54) SYSTEM AND METHOD FOR AUTOMATIC RECOVERY OF MISSING METER READINGS

(71) Applicant: Trilliant Networks Inc., Cary, NC (US)

(72) Inventor: Harry Frederick Musgrove, Fleet (GB)

(73) Assignee: Trilliant Networks Inc., Cary, NC (US)

( * ) Notice: Subject to any disclaimer, the term of this patent is extended or adjusted under 35 U.S.C. 154(b) by 69 days.

(21) Appl. No.: 18/428,568

(22) Filed: Jan. 31, 2024

(65) Prior Publication Data

US 2025/0245163 A1     Jul. 31, 2025

(51) Int. Cl.
*G06F 12/0866* (2016.01)
*G06F 16/23* (2019.01)
*G06F 16/245* (2019.01)

(52) U.S. Cl.
CPC ...... *G06F 12/0866* (2013.01); *G06F 16/2379* (2019.01); *G06F 16/245* (2019.01)

(58) Field of Classification Search
None
See application file for complete search history.

(56) References Cited

U.S. PATENT DOCUMENTS

| | | | | |
|---|---|---|---|---|
| 10,785,329 | B2 * | 9/2020 | Tapse | H04L 67/535 |
| 2019/0327029 | A1 * | 10/2019 | Mittal | H04L 67/12 |
| 2022/0416571 | A1 * | 12/2022 | Casey | H02J 3/381 |

FOREIGN PATENT DOCUMENTS

| | | |
|---|---|---|
| CN | 113890185 A | 1/2022 |
| CN | 114021202 A | 2/2022 |
| CN | 114048200 A | 2/2022 |
| CN | 111046026 B | 4/2023 |
| TW | 202232906 A | 8/2022 |
| WO | WO 2014073924 A1 | 5/2014 |

OTHER PUBLICATIONS

Jouni Peppanen; Handling bad or missing smart meter data through advanced data imputation; IEEE; pp. 1-5.*

* cited by examiner

*Primary Examiner* — Ann J Lo
*Assistant Examiner* — Jermaine A Mincey
(74) *Attorney, Agent, or Firm* — Moser Taboada

(57) ABSTRACT

According to some embodiments, a method for recovering missing meter readings for a plurality of meters on a network, the method comprising: periodically retrieving cached requests from a first database, wherein the cached requests are for missing meter reading data from a time series of meter readings for a plurality of meters; for each meter associated with the missing meter reading data, verifying whether the retrieved cached request is pending in a second database; determining that at least one retrieved cached request is not pending in the second database; deleting the at least one retrieved cached request from the first database; storing the at least one retrieved cached request in the second database; and sending the at least one retrieved cached request to the respective meter to request the missing meter reading data.

20 Claims, 4 Drawing Sheets

SYSTEM AND METHOD FOR AUTOMATIC RECOVERY OF MISSING METER READINGS

FIELD

This disclosure relates to data reconciliation, and, more specifically, to automatic recovery of missing meter reading data.

BACKGROUND

Meters, such as utility (e.g., electric or water) meters, may be connected to a network for remote meter reading. In various instances, obtaining the expected readings can prove to be challenging. Numerous factors can contribute to this, resulting in delayed or entirely missing readings.

Meters may encounter technical issues or experience temporary shutdowns, preventing accurate data collection. One primary reason is the offline status of meters at the time of measurement. Additionally, larger network issues can also disrupt the smooth flow of readings. Issues such as network outages, connectivity problems, or infrastructure failures can hinder the transmission and retrieval of data. These challenges highlight the complex nature of data collection and emphasize the importance of monitoring and addressing such issues to ensure accurate and timely readings.

In some instances, customers may prepay for a service and the meter may collect meter readings used to debit a customer account. In such cases, if there is an interruption in the data from the meter before the end of a billing cycle, a service provider (e.g., a utility) may not be able to accurately charge the user for their usage, thereby causing revenue loss for the service provider (e.g., the utility company).

In some instances, missing meter readings may be retrieved through a manual process. However, such manual processes are labor intensive and may be prone to human error. Moreover, manual processes are often not coordinated with network traffic flows, which can further slow down network traffic during normal meter data collection.

Thus, what is needed is a streamlined and automated approach to obtain missing meter readings.

SUMMARY

Methods and systems are described herein for automatic recovery of missing meter readings. In some embodiments, a method for recovering missing meter readings for a plurality of meters on a network, the method comprising: periodically retrieving pending cached requests from a first database, wherein the cached requests are for missing meter reading data from a time series of meter readings for a plurality of meters; for each meter associated with the missing meter reading data, verifying whether the retrieved cached request is pending in a second database; determining that at least one retrieved cached request is not pending in the second database; deleting the at least one retrieved cached request from the first database; storing the at least one retrieved cached request in the second database; and sending the at least one retrieved cached request to the respective meter to request the missing meter reading data.

In some embodiments, a method for recovering missing meter readings for a plurality of meters on a network, the method comprising: querying a time series database for missing meter reading data from a time series of meter readings for a plurality of meters; verifying whether a cached request for the missing meter reading data is pending in a first database; determining that the cached request is not pending, storing the cached request in the first database; periodically retrieving cached requests from the first database; for each meter associated with the missing meter reading data, verifying whether the retrieved cached request is pending in a second database; determining that the retrieved cached request is not pending; deleting the cached request from the first database; storing the cached request in the second database; sending the cached request to the respective meter; receiving a request response from the meter with the missing meter reading data; and updating the time series database using the missing meter reading data from the request response.

In some embodiments, an apparatus for recovering missing meter readings for a plurality of meters on a network, the apparatus comprising: at least one processor; and at least one non-transient computer readable medium for storing instructions which, when executed by the at least one processor, causes the apparatus to perform operations comprising: querying a time series database for missing meter reading data from a time series of meter readings for a plurality of meters; verifying whether a cached request for the missing meter reading data is pending in a first database; determining that the cached request is not pending, storing the cached request in the first database; periodically retrieving cached requests from the first database; for each meter associated with the missing meter reading data, verifying whether the retrieved cached request is pending in a second database; determining that the retrieved cached request is not pending; deleting the cached request from the first database; storing the cached request in the second database; and sending the cached request to the respective meter; receiving a request response from the meter with the missing meter reading data; and updating the time series database using the missing meter reading data from the request response.

In some embodiments, an apparatus for recovering missing meter readings for a plurality of meters on a network, the apparatus comprising: at least one processor; and at least one non-transient computer readable medium for storing instructions which, when executed by the at least one processor, causes the apparatus to perform operations comprising: periodically retrieving cached requests from a first database, wherein the cached requests are for missing meter reading data from a time series of meter readings for a plurality of meters; for each meter associated with the missing meter reading data, verifying whether the retrieved cached request is pending in a second database; determining that at least one retrieved cached request is not pending in the second database; deleting the at least one retrieved cached request from the first database; storing the at least one retrieved cached request in the second database; and sending the at least one retrieved cached request to the respective meter to request the missing meter reading data.

Other and further embodiments in accordance with the present principles are described below.

Figure 1:
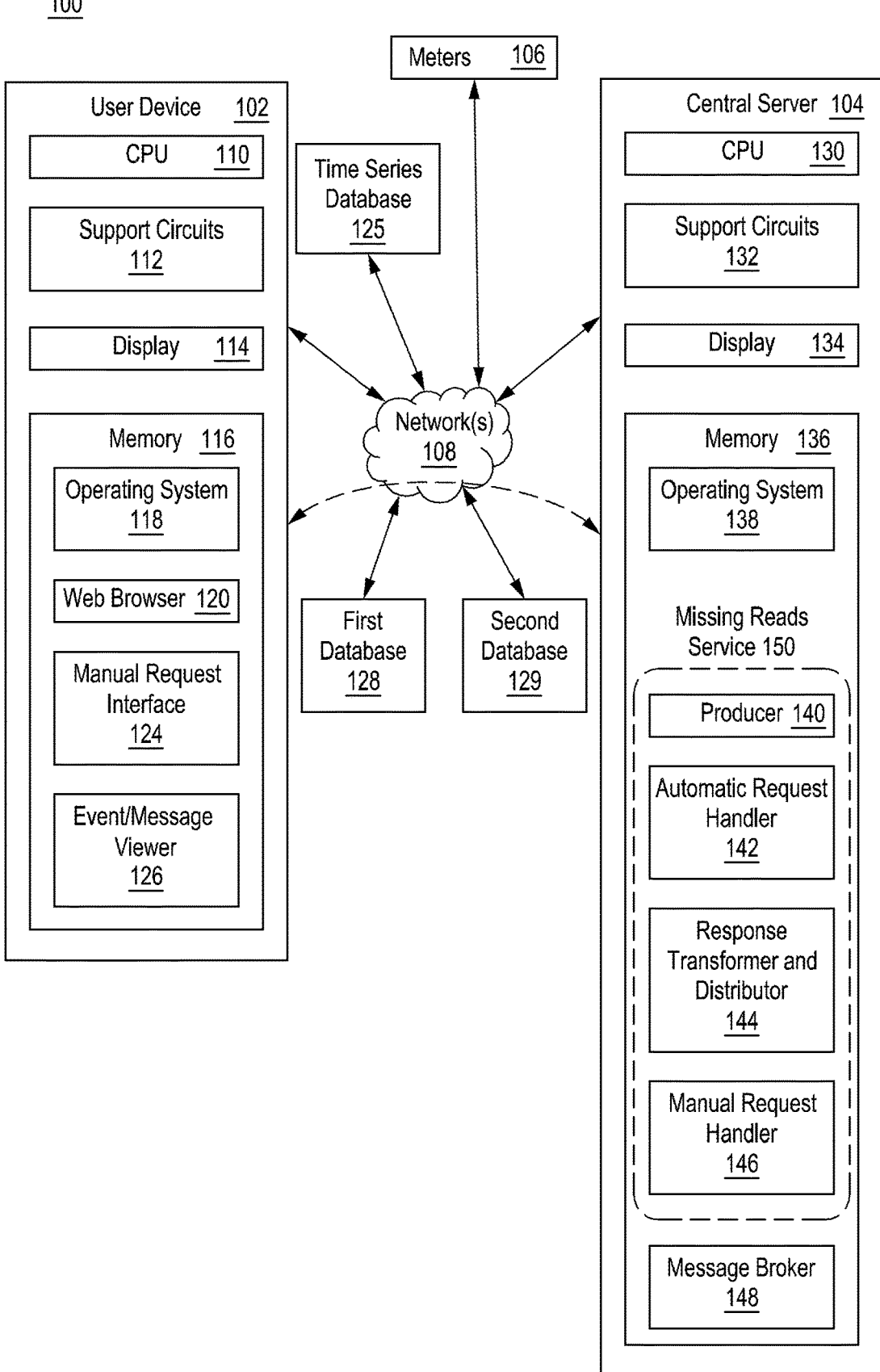
FIG. 1 depicts a high-level block diagram of a network architecture of a system in accordance with an embodiment of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, apparatuses, and systems) for automatic recovery of missing meter readings. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with meter readings stored as a time series in a database or other persistent memory, which may include gaps in the series of meter readings. The gaps in the series represent missing meter readings or meter data that has not been recorded in the time series and which creates an inaccurate record of customer usage, which can in turn, result in losses to a service provider.

The methods and systems described herein provide for automated meter reading retrieval in a sensible fashion that does not to overload a meter network. This is done by a series of queries of collected information, calculating missing data timeframes/meters, and sending out series of requests to retrieve the missing meter reading data within tight defined checks and balances to facilitate network stability. Specifically, the methods and systems described herein make use of multiple data storage areas (e.g., databases or caches), which may be arranged as an in-memory cache service to keep track of missing meter reading requests and progress of those requests. Moreover, the method and systems described herein allow for users to initiate manual missing meter reading requests. However, such manually initiated requests are processed automatically to prevent any end-user errors and to reduce network imbalance.

As result, the methods and systems in accordance with this disclosure are highly scalable and efficient to prevent unnecessary computer processing of invalid requests. Thus, the embodiments of methods and systems described in accordance with this disclosure improve the functionality of computer systems and improve data communication within a meter network.

FIG. 1 depicts a high-level block diagram of a network architecture of a network 100 (e.g., a system) in accordance with some embodiments of the present disclosure. The network 100 may include one or more user devices 102, a centralized server 104, one or more meters 106, a time series database 125, a first database 128, and a second database 129, communicatively coupled via one or more networks 108.

Figure 3:
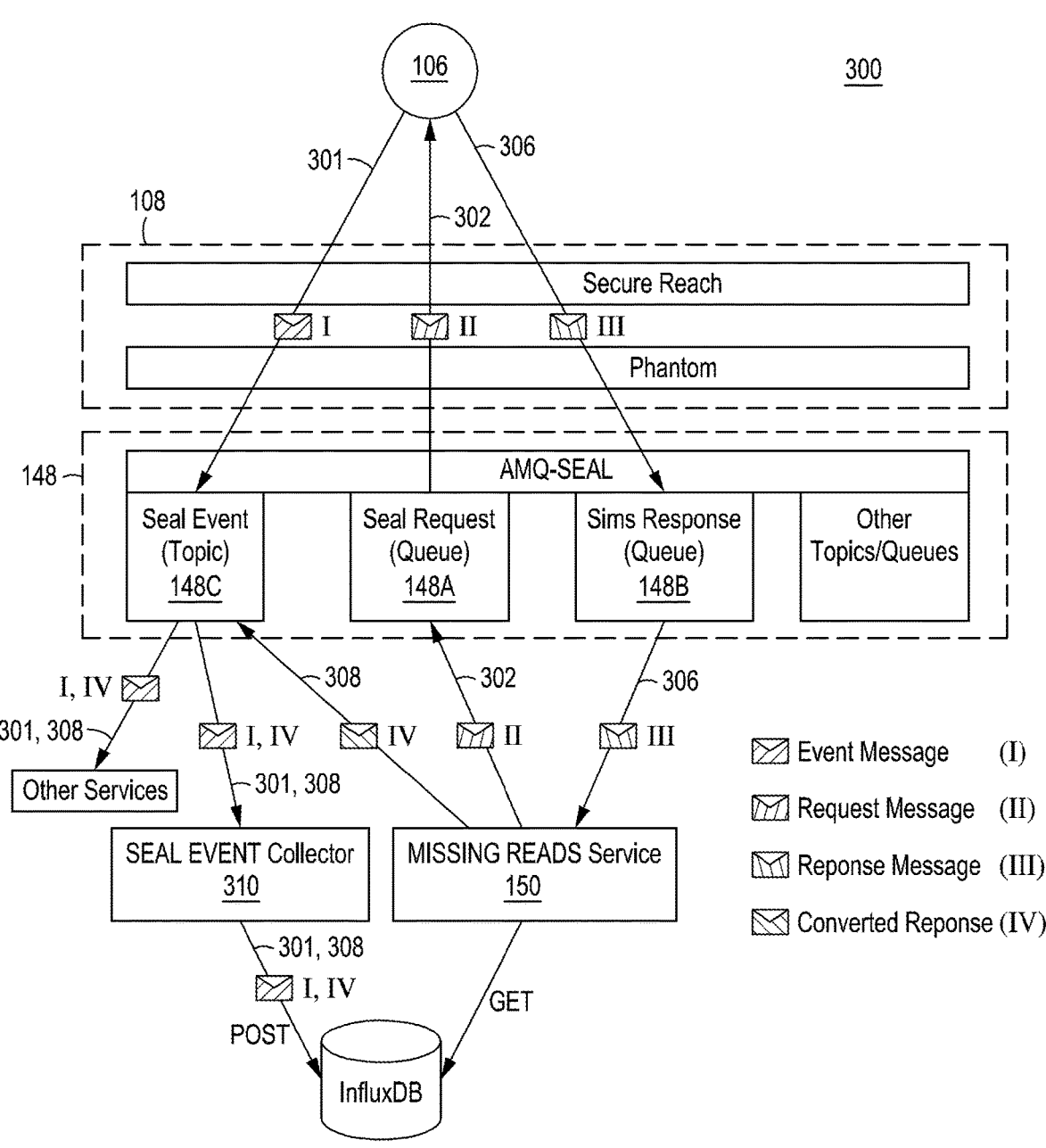
FIG. 3 depicts a flow diagram illustrating message flow in the network of FIG. 1 in accordance with some embodiments of the present disclosure.

The networks 108 comprise one or more communication systems that connect computers by wire, cable, fiber optic and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources. In some embodiments, and as shown in FIG. 3, the networks 108 may include a low power wide area network (LPWAN) (e.g., TRILLIANT SECUREREACH™) and a head-end system that standardizes message formats from different network technologies.

The end-user device (also referred throughout as "user device") 102 may comprise a Central Processing Unit (CPU) 110, support circuits 112, display device 114, and a memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, web browser 120, a manual request interface 124, and an event/message viewer 126.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well-known application for accessing and displaying web page content. Such browsers include, but are not limited to, Safari®, Chrome®, Explorer®, Firefox®, etc. The manual request interface 124 and the event/message viewer 126 may be applications that may be run by the web browser 120 or the operating system 118.

In some embodiments, the manual request interface 124 and/or the event/message viewer 126 may run in response to user interaction with the user device 102. In embodiments, a user may use the manual request interface to manually initiate a request for meter readings missing from the time series database 125. In some embodiments, the event/message viewer 126 may be run to allow user to monitor the status of outstanding meter reading requests and responses.

In embodiments, the centralized server 104 is configured to receive missing read requests from the user device 102 and to automatically manage a flow of missing data requests and responses to update the time series database 125 with missing meter readings.

The centralized server 104 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138, a producer 140, a missing reads service 150 and a message broker 148. The missing reads service 150 may include an automatic request handler 142, a response transformer and distributor 144, a manual request handler 146, and a message broker 148. In some embodiments, the automatic request handler 142, a response transformer and distributor 144, and manual request handler 146. In some embodiments, the message broker 148 may be separate from the central server 104 and may, for example, run on a separate web server or as a cloud service.

In some embodiments, the producer 140 may be configured to periodically query the time series database for missing meter reading data and processes data into requests, which are cached, for missing meter reading data for certain blocks of time, such as four-hour block requests.

In some embodiments, the automatic request handler 142 may manage cached requests to a head-end of a utility or service provider. The automatic request handler 142 may periodically retrieve cached requests from the first database 128 and, for each device (e.g., meters 106) in the received requests, check if the cached request is still pending in a second database 129. In some embodiments, it may be determined that the cached request is not still pending in the second database 129, and, therefore, the automatic request handler 142 may submit the cached request to the message broker 148, store the cached request in the second database 129, and delete the cached request in the first database 128.

The message broker 148 may be configured to receive cached requests from the automatic request handler 142, send a request to a corresponding meter 106 for the missing meter reading data, and receive a response from the meter 106. In some embodiments, the message broker 148 may be at the head-end. In some embodiments, the message broker 148 may be configured to receive and collect event messages from the meter 106 and messages associated with the cached request and the response from the missing reads service 150. In some embodiments, the message broker 148 is configured to send event messages to an event collector 301 (FIG. 3) that can post missing meter reading data to the time series database 125. In some embodiments, the message broker 148 may use an AMQ message broker provided by Red Hat™, Inc., Raleigh, North Carolina.

The response transformer and distributor 144 may be configured to transform and forward data to relevant services. In some embodiments, the response transformer and distributor 144 may receive request responses from the message broker 148 and verify whether the cached request is still pending in the second database 129. In some embodiments, a determination is made that the cached request is still pending in the second database 129, and, therefore, the response transformer and distributor 144 may transform the response into an event message and delete the cached request from the second database 129. The response transformer and distributor event message can be sent to the message broker 148 for collection and to the time series database 125 for updating the time series database 125 with the missing meter reading data.

The manual request handler 146 may be configured to receive a manual request for missing meter reading data and store the request in the first database 128. The automatic request handler 142 may then process the cached requests stored in the first database 128 as discussed above.

Figure 2:
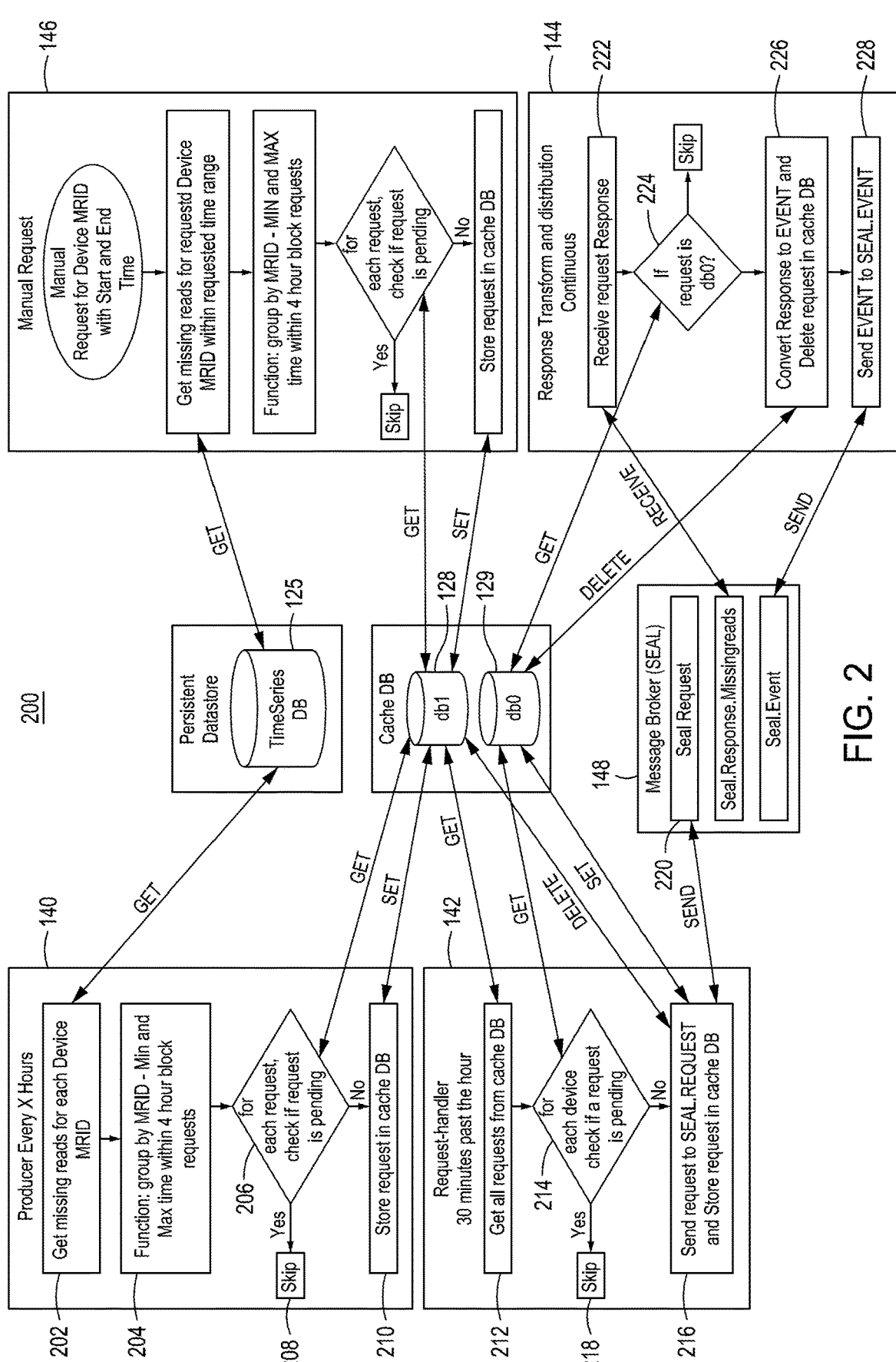
FIG. 2 depicts a flow diagram illustrating a method for recovering missing meter readings for a plurality of meters on a network in accordance with some embodiments of the present disclosure.

FIG. 2 shows a flow chart of a method 200 for recovering missing meter readings for a plurality of meters 106 on the network 100. At block 202 the producer 140 may periodically (e.g., every certain number of seconds, minutes, or hours) may query the time series database 125 and retrieve missing meter readings for each meter ID corresponding to a meter 106 from the time series database 125. At block 204, the method 200 may generate requests for a range of meter IDs within a predefined time block. At block 206 the method 200 may determine whether each request is cached and pending in the first database 128. If it is determined that the request is pending (YES at block 206) then the method 200 skips to check the next request at block 208. If it is determined that the request is not pending in the first database 128 (NO at block 206), then the method 200 stores the request in the first database 128 at block 210 and then checks the next request at block 208.

At block 212, the method 200 may include using the automatic request handler 142 for periodically (e.g., hourly) retrieving pending/cached requests from the first database 128. In some embodiments, all pending/cached requests in the first database 128 are periodically retrieved. At block 214, the method 200 may include, for each meter associated with the missing meter reading data, verifying whether the received cached request is pending in the second database 129. If it is determined that the received cached request is not pending in the second database 129 (NO at block 214), then the method 200 may include deleting the cached request from the first database 128 and storing the cached request in the second database 129, and sending the cached request to the respective meter corresponding to the meter ID (e.g., via the message broker 148) at block 216. If it is determined that the received cached request is pending in the second database 129 (YES at block 214), then the method 200 may skip to checking for the next meter in the received cached request at block 218.

At block 220 of the method 200, the message broker 148 may receive from the meter 106 a request response that contains the missing meter reading data, which may be forwarded to the response transformer and distributor 144 at block 222. At block 224, the method 200 may include, upon receiving the request response, verifying whether the cached request is still pending in the second database 129. If it is determined that the cached request is still pending in the second database 129 (YES at block 224), then the method 200 may include, at block 226, converting the request response to an event causing the cached request to be deleted from the second database 129, and sending an event message to the message broker at block 228. If it is determined that the cached request is not still pending in the second database 129 (NO at block 224), then the method 200 may skip to checking the next response received from the message broker 148.

At block 230 of the method 200, the message broker 148 may receive the event message and send the event message to the time series database 125 with the missing meter reading data. At block 232, the method 200 may include updating the time series database 125 using the missing meter reading data from the request response. For example, the missing meter reading data may be merged with the existing meter reading data stored in time series database 125.

In the embodiment shown in FIG. 2, the querying at block 202 may be initiated automatically. At block 240, the manual request handler 146 may initiate a manual query of the time series database 125. At block 242, the method 200 may include retrieving missing meter readings for requested meter IDs within a requested time range. At block 244, the method 200 may generate requests for a range of meter IDs within a predefined time block. At block 246, the method 200 may determine whether each request is cached and pending in the first database 128. If it is determined that the request is pending in the first database 128 (YES at block 246), then the method 200 may skip to check the next request at block 248. If it is determined that the request is not pending in the first database 128 (NO at block 246), then the method 200 may store the request in the first database 128 at block 250, and then checks the next request at block 248. Once the requests are stored in the first database 128, the cached requests may be processed by the automatic request handler 142 as described herein.

FIG. 3 depicts a flow diagram illustrating message flow 300 in the network 100 of FIG. 1 in accordance with some embodiments of the present disclosure. The message broker 148 receives a request message 302 from the missing reads service 150. The request message 302 may include the cached request. More specifically, the request message 302 may be generated by the automatic request handler 142 of the missing reads service 150. The received request message 302 may be queued in request queue 148A of the message broker 148 and sent by the message broker 148 to meter(s) 106 as shown in FIG. 3. The meter(s) 106 may send a response message 306 to a response queue 148B of the message broker 148. The message broker 148 may send the response message 306 from the response queue 148B to the missing reads service 150. More specifically, the response message 306 may be received by the response transformer and distributor 144. The missing reads service 150, and more particularly the response transformer and distributor 144, may convert the response message 306 to an event message 308 as described herein, and send the event message 308 to an event queue 148C of the message broker 148. The message broker 148 may send the event message 308 to the time series database 125 directly or through an event collector 310 for updating of the time series database 125 with the missing meter reading data.

Figure 4:
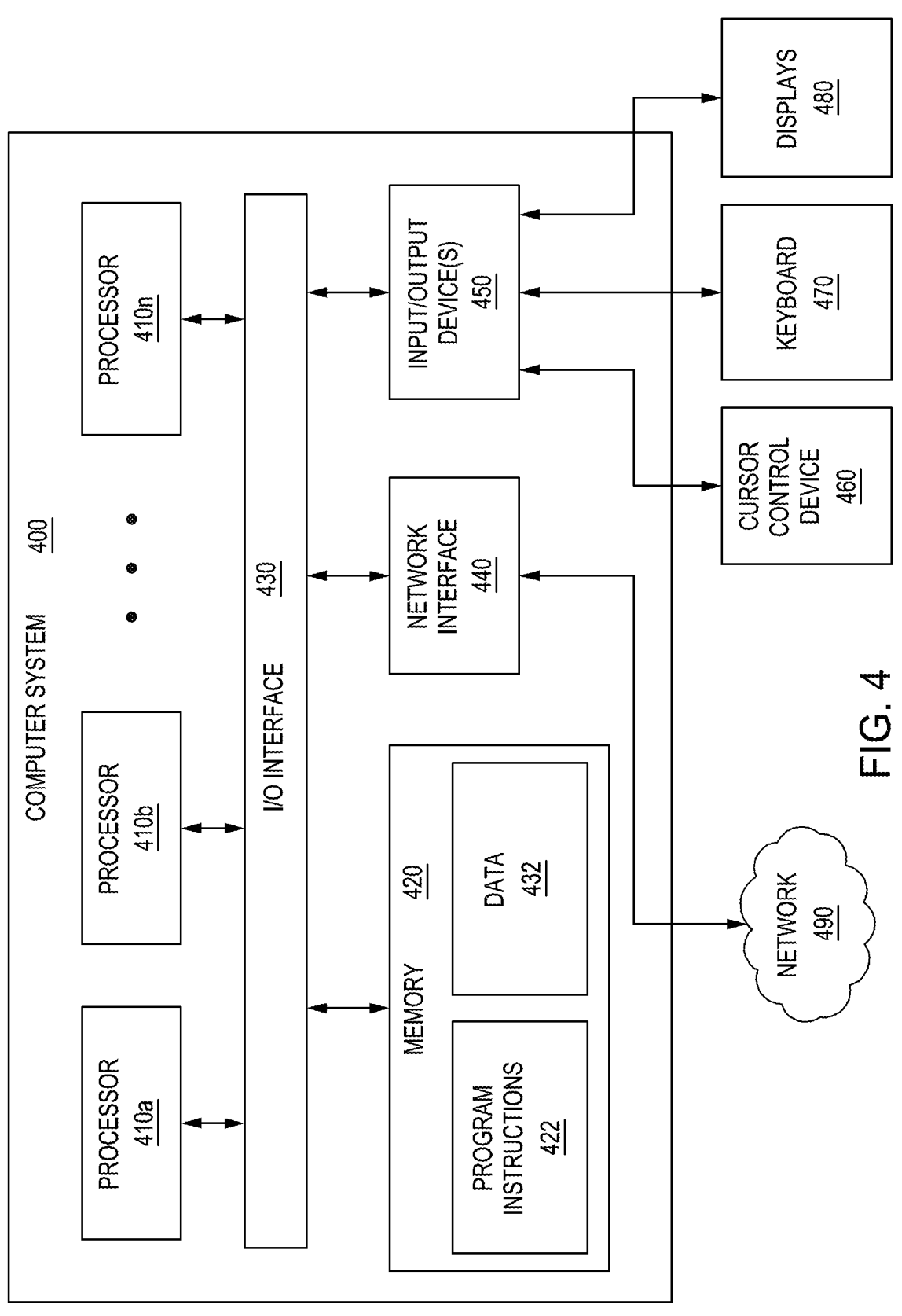
FIG. 4 depicts a high-level block diagram of a computing device suitable for use with embodiments for automatic recovery of missing meter readings in accordance with the present disclosure.

FIG. 4 depicts a computer system 400 that can be utilized in various embodiments of the invention to implement the computer and/or the display, according to one or more embodiments.

Various embodiments of methods and systems, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/ output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example, via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

The invention claimed is:

1. A method for recovering missing meter readings for a plurality of meters on a network, the method comprising: periodically retrieving cached requests from a first database, wherein the cached requests are requests for missing meter reading data from a time series of meter readings for a plurality of meters; for each meter associated with the missing meter reading data, verifying whether the retrieved cached request is pending in a second database, wherein the plurality of meters are different from the first database and the second database; determining that at least one retrieved cached request is not pending in the second database; deleting the at least one retrieved cached request from the first database; storing the at least one retrieved cached request in the second database;

sending the at least one retrieved cached request to each meter associated with the missing meter data to retrieve the missing meter reading data from each respective meter, receiving a request response from the meter with the missing meter reading data; and upon receiving the request response, determining that the cached request is still pending in the second database, updating the time series of meter readings using the missing meter reading data from the request response, and deleting the cached request from the second database, wherein the meters are communicatively coupled together in the network and the requests are electronically transmitted and stored as messages through the network.

2. The method of claim 1, further comprising: upon receiving the request response, verifying whether the cached request is still pending in the second database.

3. The method of claim 2, further comprising: converting the request response to an event causing the cached request to be deleted from the second database; and sending an event message to the time series of meter readings with the missing meter reading data.

4. The method of claim 1, further comprising: querying the time series of meter readings for the missing meter reading data for each meter; and verifying whether a cached request for the missing meter reading data is pending in the first database, determining that the cached request is not pending, and storing the cached request in the first database.

5. The method of claim 4, further comprising grouping the missing data into time blocks for each cached request, wherein the time blocks are predefined.

6. The method of claim 4, wherein the querying is initiated automatically periodically.

7. The method of claim 4, wherein the querying is initiated manually.

8. The method of claim 1, wherein all cached requests in the first database are periodically retrieved.

9. A method for recovering missing meter readings for a plurality of meters on a network, the method comprising: querying a time series database for missing meter reading data from a time series of meter readings for a plurality of meters; verifying whether a request for the missing meter reading data is pending in a first database; determining that the request is not pending and storing the request in the first database as a cached response, wherein the plurality of meters are different from the first database and the second database; periodically retrieving cached requests from the first database; for each meter associated with the missing meter reading data, verifying whether the retrieved cached request is pending in a second database; determining that the retrieved cached request is not pending; deleting the cached request from the first database; storing the cached request in the second database; sending the at least one retrieved cached request to each meter associated with the missing meter data to retrieve the missing meter reading data from each respective meter; receiving a request response from the meter with the missing meter reading data; and upon receiving the request response, determining that the cached request is still pending in the second database, and updating the time series database using the missing meter reading data from the request response, wherein the meters are communicatively coupled together in the network and the requests are electronically transmitted and stored as messages through the network.

10. The method of claim 9, further comprising grouping the missing meter reading data into time blocks for each cached request, wherein the time blocks are predefined.

11. The method of claim 9, wherein all cached requests in the first database are periodically retrieved.

12. The method of claim 9, further comprising: upon receiving the request response, deleting the cached request from the second database.

13. The method of claim 9, further comprising: converting the cached request response to an event causing the cached request to be deleted from the second database; and sending an event message to the time series database with the missing meter reading data.

14. An apparatus for recovering missing meter readings for a plurality of meters on a network, the apparatus comprising: at least one processor; and at least one non-transient computer readable medium for storing instructions which, when executed by the at least one processor, causes the apparatus to perform operations comprising: querying a time series database for missing meter reading data from a time series of meter readings for a plurality of meters; verifying whether a cached request for the missing meter reading data is pending in a first database; determining that the cached request is not pending, storing the cached request in the first database; periodically retrieving cached requests from the first database; for each meter associated with the missing meter reading data, verifying whether the retrieved cached request is pending in a second database, wherein the plurality of meters are different from the first database and the second database; determining that the retrieved cached request is not pending; deleting the cached request from the first database; storing the cached request in the second database; sending the at least one retrieved cached request to each meter associated with the missing meter data to retrieve the missing meter reading data from each respective meter; receiving a request response from the meter with the missing meter reading data; and upon receiving the request response, determining that the cached request is still pending in the second database, and updating the time series database using the missing meter reading data from the request responses wherein the meters are communicatively coupled together in the network and the requests are electronically transmitted and stored as messages through the network.

15. An apparatus for recovering missing meter readings for a plurality of meters on a network, the apparatus comprising: at least one processor; and at least one non-transient computer readable medium for storing instructions which, when executed by the at least one processor, causes the apparatus to perform operations comprising: periodically retrieving cached requests from a first database, wherein the cached requests are requests for missing meter reading data from a time series of meter readings for a plurality of meters; for each meter associated with the missing meter reading data, verifying whether the retrieved cached request is pending in a second database, wherein the plurality of meters are different from the first database and the second database; determining that at least one retrieved cached request is not pending in the second database; deleting the at least one retrieved cached request from the first database; storing the at least one retrieved cached request in the second database; sending the at least one retrieved cached request to each meter associated with the missing meter data to retrieve the missing meter reading data from each respective meter;

receiving a request response from the meter with the missing meter reading data; and upon receiving the request response, determining that the cached request is still pending in the second database, and updating the time series of meter readings using the missing meter reading data from the request response, wherein the meters are communicatively coupled together in the network and the requests are electronically transmitted and stored as messages through the network.

16. The apparatus of claim 15, wherein the operations further comprise:

querying the time series of meter readings for the missing meter reading data for each meter; and verifying whether the cached request for the missing meter reading data is pending in the first database;

determining that the cached request is not pending in the first database; and storing the cached request in the first database.

17. The apparatus of claim 16, wherein the operations further comprise grouping the missing meter reading data into time blocks for each cached request, wherein the time blocks are predefined.

18. The apparatus of claim 16, wherein the querying is initiated automatically periodically.

19. The apparatus of claim 16, wherein the querying is initiated manually.

20. The apparatus of claim 15, wherein all cached requests in the first database are retrieved.

* * * * *